United States Patent
Ly

(10) Patent No.: US 8,231,461 B2
(45) Date of Patent: Jul. 31, 2012

(54) JACKPOT SYSTEM

(75) Inventor: Sen Van Ly, Lidcombe (AU)

(73) Assignee: Aristocrat Technologies Australia Pty Limited (AU)

( * ) Notice: Subject to any disclaimer, the term of this patent is extended or adjusted under 35 U.S.C. 154(b) by 627 days.

(21) Appl. No.: 12/349,878

(22) Filed: Jan. 7, 2009

(65) Prior Publication Data

US 2009/0191954 A1 Jul. 30, 2009

(30) Foreign Application Priority Data

Jan. 9, 2008 (AU) ................................ 2008900103

(51) Int. Cl.
*A63F 9/24* (2006.01)
(52) U.S. Cl. ................. 463/27; 463/16; 463/20; 463/25; 463/26
(58) Field of Classification Search ............ 463/16, 463/20, 26
See application file for complete search history.

(56) References Cited

U.S. PATENT DOCUMENTS

| | | | |
|---|---|---|---|
| 6,089,980 A | 7/2000 | Gauselmann | |
| 6,450,887 B1 * | 9/2002 | Mir et al. ......................... | 463/42 |
| 7,056,215 B1 | 6/2006 | Olive | |
| 7,771,276 B2 * | 8/2010 | Beatty et al. ..................... | 463/27 |
| 7,794,322 B2 * | 9/2010 | Schneider et al. ............. | 463/27 |
| 7,862,427 B2 * | 1/2011 | Nguyen et al. ................. | 463/27 |
| 7,927,209 B2 * | 4/2011 | Gagner et al. .................. | 463/25 |
| 2001/0049303 A1 | 12/2001 | Found et al. | |
| 2003/0073497 A1 * | 4/2003 | Nelson ............................ | 463/42 |
| 2003/0092484 A1 | 5/2003 | Schneider et al. | |
| 2003/0092490 A1 | 5/2003 | Gauselmann | |
| 2003/0119579 A1 | 6/2003 | Walker et al. | |
| 2004/0092304 A1 | 5/2004 | George et al. | |
| 2005/0079911 A1 * | 4/2005 | Nakatsu ........................... | 463/26 |
| 2005/0181854 A1 | 8/2005 | Moshal | |
| 2005/0282628 A1 * | 12/2005 | Beatty et al. .................... | 463/27 |
| 2006/0073888 A1 | 4/2006 | Nguyen et al. | |
| 2006/0183529 A1 | 8/2006 | Acres et al. | |
| 2006/0183536 A1 * | 8/2006 | Gagner et al. .................. | 463/26 |
| 2006/0217188 A1 | 9/2006 | Walker et al. | |
| 2006/0253702 A1 | 11/2006 | Lowell et al. | |
| 2006/0258424 A1 * | 11/2006 | Green ............................... | 463/16 |

(Continued)

FOREIGN PATENT DOCUMENTS

BE 1014377 9/2003

(Continued)

*Primary Examiner* — Minh-Loan T Tran
*Assistant Examiner* — William Harriston
(74) *Attorney, Agent, or Firm* — McAndrews, Held & Malloy, Ltd.

(57) ABSTRACT

A jackpot system comprising at least two jackpot controllers including a first jackpot controller arranged to act at least as a master jackpot controller and a second jackpot controller arranged to act as either a master or a slave jackpot controller, the first jackpot controller arranged to act as the master jackpot controller by conducting at least one jackpot during which the master jackpot controller aggregates jackpot data and at least periodically communicates the aggregated data to at least the second jackpot controller, and the second jackpot controller arranged to act initially as the slave jackpot controller and communicate jackpot data to the first jackpot controller for aggregation, the second jackpot controller arranged to store the aggregated data received from the first jackpot controller and to act as the master controller if the master jackpot controller fails by continuing to conduct the at least one jackpot based on the stored aggregated data and by aggregating further jackpot data.

13 Claims, 5 Drawing Sheets

U.S. PATENT DOCUMENTS

| | | |
|---|---|---|
| 2007/0032301 A1 | 2/2007 | Acres et al. |
| 2007/0060263 A1 | 3/2007 | Englman et al. |
| 2007/0060357 A1 | 3/2007 | Nassef |
| 2007/0060365 A1* | 3/2007 | Tien et al. ............... 463/42 |
| 2007/0105619 A1* | 5/2007 | Kniesteadt et al. ......... 463/26 |
| 2007/0117607 A1 | 5/2007 | Olive |
| 2007/0124675 A1 | 5/2007 | Ban et al. |
| 2007/0129129 A1 | 6/2007 | Tinghitella |
| 2007/0136817 A1 | 6/2007 | Nguyen |
| 2007/0155490 A1 | 7/2007 | Phillips et al. |
| 2007/0168251 A1 | 7/2007 | Hilbert et al. |
| 2007/0180371 A1 | 8/2007 | Kammler |
| 2007/0191088 A1* | 8/2007 | Breckner et al. ........... 463/20 |
| 2008/0020846 A1* | 1/2008 | Vasquez et al. ............ 463/42 |
| 2008/0070679 A1* | 3/2008 | Seelig et al. .............. 463/26 |
| 2008/0153564 A1* | 6/2008 | Baerlocher et al. ......... 463/16 |
| 2009/0124366 A1* | 5/2009 | Aoki et al. ................ 463/27 |
| 2009/0131162 A1* | 5/2009 | Walkwitz et al. ........... 463/27 |
| 2009/0156301 A1* | 6/2009 | Abrink et al. .............. 463/26 |
| 2009/0191954 A1* | 7/2009 | Ly ......................... 463/25 |
| 2010/0222138 A1* | 9/2010 | Luciano et al. ............ 463/27 |
| 2011/0014964 A1* | 1/2011 | Crowder et al. ............ 463/13 |
| 2011/0092278 A1* | 4/2011 | Johnson .................. 463/27 |

FOREIGN PATENT DOCUMENTS

| | | |
|---|---|---|
| CA | 2558913 | 3/2007 |
| CA | 2559412 | 3/2007 |
| CA | 2528267 | 5/2007 |
| DE | 202005005719 U | 7/2005 |
| EP | 1805737 | 7/2007 |
| GB | 2431119 | 4/2007 |
| JP | 2001070538 | 3/2001 |
| JP | 2006034624 | 2/2006 |
| JP | 2006043020 | 2/2006 |
| JP | 2006068424 | 3/2006 |
| JP | 2006346030 | 12/2006 |
| JP | 2006346066 | 12/2006 |
| JP | 2007044217 | 2/2007 |
| JP | 2007044293 | 2/2007 |
| JP | 2007061589 | 3/2007 |
| KR | 20030069160 | 8/2003 |
| KR | 20040042091 | 5/2004 |
| KR | 20040047314 | 6/2004 |
| NZ | 544852 | 6/2007 |
| WO | 0225443 A1 | 3/2002 |
| WO | 2006052212 | 5/2006 |
| WO | 2006091490 | 8/2006 |
| WO | 2007005082 | 1/2007 |
| WO | 2007014000 | 2/2007 |
| WO | 2007021995 | 2/2007 |
| WO | 2007032916 | 3/2007 |
| WO | 2007041515 | 4/2007 |
| WO | 2007044175 | 4/2007 |
| WO | 2007078654 | 7/2007 |

* cited by examiner

JACKPOT SYSTEM

RELATED APPLICATIONS

This application claims priority to Australian Provisional Patent Application No. 2008900103, having a filing date of Jan. 9, 2008, which is incorporated herein by reference in its entirety.

FEDERALLY SPONSORED RESEARCH OR DEVELOPMENT

Not Applicable]

MICROFICHE/COPYRIGHT REFERENCE

Not Applicable]

FIELD OF THE INVENTION

The present invention relates to a jackpot system and a method of conducting a jackpot.

BACKGROUND OF THE INVENTION

Currently jackpot systems are conducted predominately at the venue level. Some wide area jackpot systems have been developed. The problems with existing wide area jackpot systems include significant delays in updating jackpot data and heavy reliance being placed on the central jackpot controller that maintains the wide area network. Such existing systems are susceptible to substantial problems if the centralized network controller fails.

The present invention aims to provide an alternative jackpot system.

BRIEF SUMMARY OF THE INVENTION

In a first aspect, the invention provides a jackpot system comprising at least two jackpot controllers including a first jackpot controller arranged to act at least as a master jackpot controller and a second jackpot controller arranged to act as either a master or a slave jackpot controller, the first jackpot controller arranged to act as the master jackpot controller by conducting at least one jackpot during which the master jackpot controller aggregates jackpot data and at least periodically communicates the aggregated data to at least the second jackpot controller, and the second jackpot controller arranged to act initially as the slave jackpot controller and communicate jackpot data to the first jackpot controller for aggregation, the second jackpot controller arranged to store the aggregated data received from the first jackpot controller and to act as the master controller if the master jackpot controller fails by continuing to conduct the at least one jackpot based on the stored aggregated data and by aggregating further jackpot data.

In an embodiment, the jackpot system comprises at least a third jackpot controller is arranged to act as either a master or slave jackpot controller and is arranged to receive and store aggregated data from at least one of the first and second jackpot controllers and to continue to conduct the at least one jackpot based on the stored aggregated data in a reconfigured jackpot system in which the third jackpot controller acts as the master controller if the first and second jackpot controllers fail.

In an embodiment, the jackpot system comprises at least one other jackpot controller arranged to act at least as a slave jackpot controller.

In an embodiment, each other jackpot controller is capable of acting either as a master or a slave jackpot controller and is arranged to receive and store aggregated data and to conduct the at least one jackpot based on the stored aggregated data in a reconfigured jackpot system if necessary.

In an embodiment, each of the jackpot controllers stores a ranking table which specifies the order in which jackpot controllers become the master jackpot controller if there are one or more failures and the jackpot system is reconfigured based on the ranking table.

In an embodiment, if the current master jackpot controller fails, each jackpot controller checks the ranking table to determine whether to start to act as a master controller.

In an embodiment, the jackpot controller that determines it is now the master jackpot controller establishes the at least one jackpot on itself.

In an embodiment, each jackpot controller that determines that it is still a slave controller establishes communication with the master jackpot controller.

In an embodiment, each jackpot controller that determines that it is still a slave controller communicates any jackpot data not in current aggregated data to the current master jackpot controller.

In an embodiment, the master jackpot controller is arranged to aggregate data for a plurality of separate jackpots and each other jackpot controller is arranged to communicate jackpot data for at least one of the jackpots.

In a second aspect, the invention provides a method of conducting a jackpot comprising:

conducting at least one jackpot by aggregating jackpot data received from a plurality of jackpot controllers at a first jackpot controller acting as a master jackpot controller;

at least periodically, communicating the aggregated data to at least a second jackpot controller acting as a slave jackpot controller and also arranged to act as the master jackpot controller;

storing the aggregated data from the first jackpot controller at the second jackpot controller; and upon the master jackpot controller failing, continuing to conduct each at least one jackpot based on the stored aggregated data with the second jackpot controller acting as the master controller.

In an embodiment the method comprises at least periodically communicating the aggregated data to a third jackpot controller is arranged to act as either a master or slave jackpot controller, and continuing to conduct the at least one jackpot based on the communicated aggregated data with the third jackpot controller acting as the master controller upon both the first and second jackpot controllers failing.

In an embodiment, the method comprises at least periodically communicating the aggregated data to each jackpot controller in the jackpot system, and continue to conduct the at least one jackpot based on the communicated aggregated data in a reconfigured jackpot system with one of the jackpot controllers if necessary.

In an embodiment, each of the jackpot controllers stores a ranking table which specifies the order in which jackpot controllers become the master jackpot controller if there are one or more failures and the jackpot system is reconfigured based on the ranking table.

In an embodiment, if the current master jackpot controller fails, the method comprises each jackpot controller checking the ranking table to determine whether to start to act as a master controller.

In an embodiment the method comprises establishing the at least one jackpot on the jackpot controller that determines it is now the master jackpot controller.

In an embodiment, each jackpot controller that determines that it is still a slave controller establishes communication with the master jackpot controller.

In an embodiment, each jackpot controller that determines that it is still a slave controller communicates any jackpot data not in current aggregated data to the current master jackpot controller.

In an embodiment the method comprises aggregating data for a plurality of separate jackpots on the master jackpot controller and each other jackpot controller communicating jackpot data for at least one of the jackpots to the master jackpot controller.

BRIEF DESCRIPTION OF SEVERAL VIEWS OF THE DRAWINGS

An embodiment of the invention is described by way of example in relation to the following figures.

DETAILED DESCRIPTION OF THE INVENTION

Overview

Figure 1:
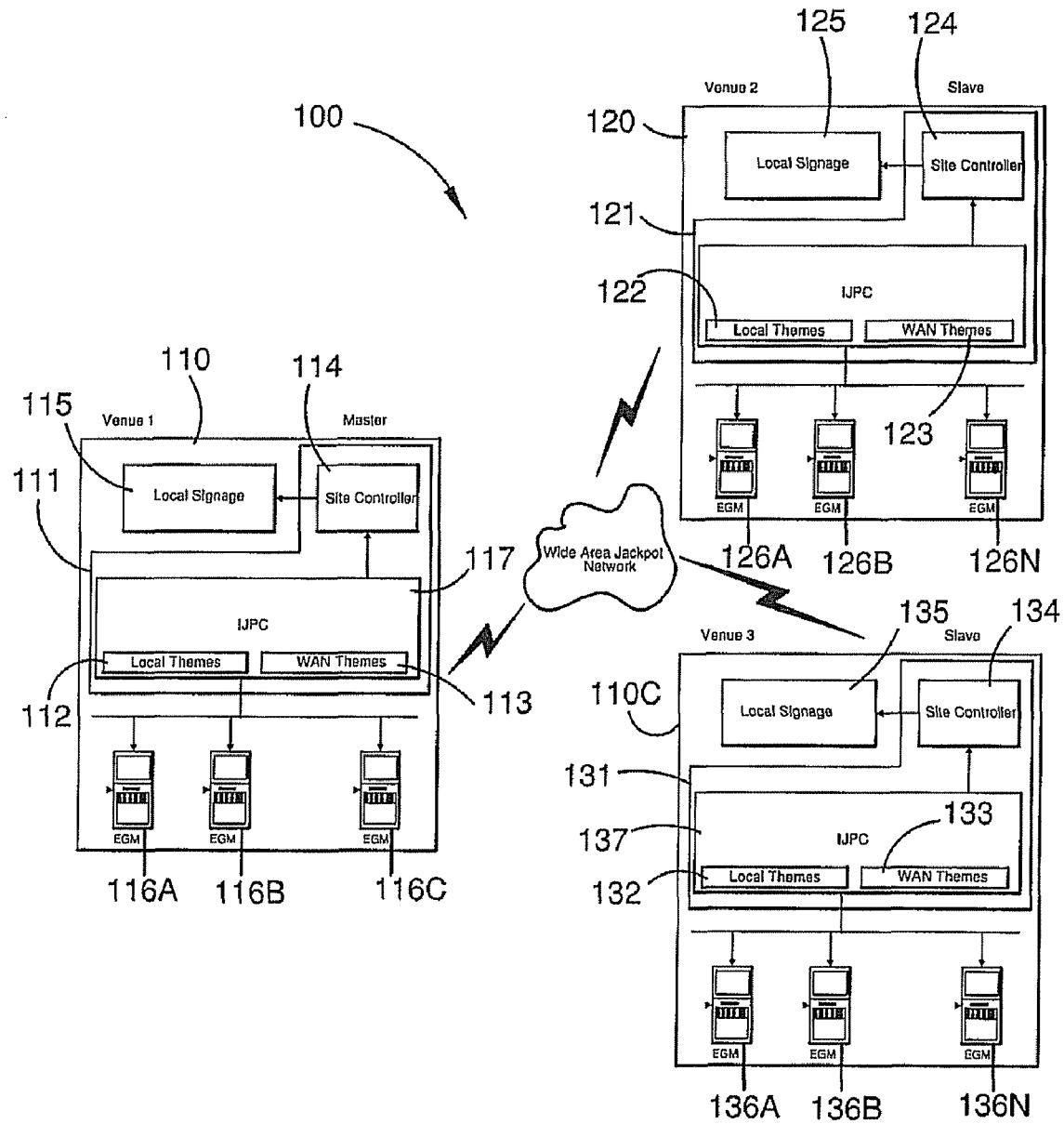
FIG. 1 shows a jackpot system of an embodiment.

Referring to FIG. 1, a Wide Area Jackpot Controller (WAJC) system 100 is used to run one or more jackpot themes across multiple venues in a Wide Area Network (WAN). The WAJC system 100 also supports local jackpot themes.

In the WAJC System 100, controllers 111,121,131 from multiple Venues may participate in Wide Area Themes. Each venue which is configured to participate in the WAN Theme/Jackpot has one or more Jackpot Controllers 111, 121, 131. One of the Controllers 111,121,131 plays the role of Master Controller 111 while all the other participating controllers are slaves 121,131. There will be only one Master controller 111 in the system 100 at any time. Each controller 111,121,131 supports not only the Wide area jackpot 113 but also Local Jackpot themes 112. The connectivity between the Master and the Slave controllers is maintained even when there is no WAN jackpot theme being played. It will be apparent to persons skilled in the art that the three controllers 111,121, 131 exemplify any configured number of jackpot controllers.

Each of the controllers 111,121,131 is assigned a unique rank. The highest ranked active controller in the WAN will be the Master controller while controllers that have not been assigned any rank or which are given a lower rank will be Slave controllers. Any controller that has been assigned a Rank has the potential to play the role of Master controller when controllers ranked higher than it fail. There can be more than one WAN jackpot theme running in the WAN system. But, it is not mandatory for a site to participate in all the WAN jackpot themes. Regardless of the number of WAN jackpot themes present there is only one Master controller 111 in the network.

A Virtual Private Network (VPN) 140 is used to connect the sites 110, 120, 130 together. Communication between controllers is based on IP protocol. Two channels of communication are used in the WAJC communication. A TCP Channel is used for data communication and a UDP channel is used for status communications between controllers.

During initial WAJC system start up, all controllers in the WAN send "Controller Init" messages to a multicast address at a configured interval. Each controller will continue sending this message until it gets a response from the Master controller or for a configured time interval. During the very first WAJC system start up, the configuration details will be available only with the Master controller. The Master by virtue of its ranking information available from the database knows that it is Master and sends out a Controller Init response message to the controllers from which it received Controller Init message. This message has the Master's IP address, its rank, requesting controller rank and Port number. The Master 111 will then start accepting connections from each of the Slave controllers 121, 131. Once the Master-Slave connection is established, database synchronization is initiated between Master and Slave.

Every time a Slave connects to the Master controller, the Jackpot Configuration data is synchronized between Master and Slave ("data sync"). After successful data sync, the Slave controller participates in the wide area theme. Similarly, whenever a jackpot configuration is changed, the changes are cascaded to all site controllers immediately. The updated Jackpot pool values, Jackpot win details are also sent to all site controllers. Thus, all controllers will have the same wide area Jackpot information and in the event of Master failure, the next highest ranked controller will play the role of Master.

The jackpot contributions from multiple participating venues are collected and consolidated by the Master 111. This consolidated jackpot amount can be won by any of the machines from a participating venue when the defined business condition is met.

The controllers 111, 121, 131 of each of the venues participating in the Wide area Jackpot have a site controller 114, 124, 134 (a software application entity, known as the WAJC application) and an Integrated Jackpot Controller (IJPC) 117, 127, 137. Both the IJPC application and WAJC application components will typically reside in the same computer. The site controllers 114 will communicate with the Master Controller and the IJPC application. The IJPC will in turn communicate with the gaming floor network extending the progressive Jackpot support for the wide area. Each site controller 114, 124, 134 will accumulate the jackpot contribution from the participating EGMs 116, 126, 136 and send this contribution to the Master controller whenever it gets a request. The Master controller 111 will consolidate the contributions received from each of the site controllers 114, 124, 134 participating in the wide area theme. The Master 111 will then send the updated Jackpot pool value periodically to all site controllers 114, 124, 134.

If the master controller 111 is offline, after a configured time out period, the next highest controller will announce itself as master and all the slave controllers will establish connection with the new master controller. When a higher ranked master controller comes online the existing master controller closes its connections with the site controllers after performing data sync with the new Master controller. All Slave controllers 121, 131 will then establish connection with the new Master controller.

The master role is relinquished to the higher ranked controllers one by one on the first come first serve basis. For example, in a scenario where controller 3 with rank 3 is the current Master and Controllers 1 and 2 are down. First, Controller 2 comes up and will send controller init message. Based on its IP and rank, the Current Master (i.e. controller 3) will relinquish its master role to Controller 2 after ensuring data transfer. Meanwhile, if Controller 1 comes up, it can take the control only from Controller 2 and play the role of the Master.

Master controller 111 sends Jackpot Pool requests periodically at a configured interval to all site controllers. The slave controllers use this request to know the status of the Master Controller 111. If a slave controller does not receive pool request for a configured period or a configured number of times, then the site controller will mark the Master's status as offline.

Similarly, site controllers 114, 124, 134 on receiving a Jackpot pool request from the Master 111 will send a response with local contribution value. The Master controller 111 will make use of the expected response to know the status of each site controller. If the Master controller does not receive any response to the poll request for a configured number of times, the Master will consider that particular site controller as offline and update the status in the database accordingly.

The Master controller 111 sends a status packet with all controllers' status information at periodic intervals to the multicast group through UDP socket to a defined port and IP address. Thus each controller is able to know the status of the other Wide Area jackpot controllers. This status information will helps the jackpot controllers to quickly determine the highest ranked active controller in case of the Master controller failure. If any of the off-line controllers comes online and enters WAN 100, the controller Init message to the same multicast group will be used to determine that the controller has joined the wide area jackpot system.

A Theme (i.e. a jackpot having a set of rules and associated graphics) can be started or stopped, either at the Master controller or Slave controller level. If a theme start message does not reach any of the site controllers, the theme can be started at the local site by manual intervention. However, a theme cannot be started at the local site unless and until it is started in the Master and is currently active. When a theme start command is given to the Master controller 111, the start information is sent to all site controllers 114, 124, 134. To start a theme, a minimum configured number of site controllers 114, 124, 134 should be available in the WAN system. If the controller limit falls below the configured limit, the theme will be stopped automatically.

The Individual Gaming Machines (EGM) are typically connected to the jackpot controller 111, 121, 131, via a Player Marketing Module (PMM) (one per EGM) and a Front End Processor (FEP) which aggregates data from a number of PMMs before providing it to the IJPC 117, 127, 137. Typically, a venue will have several FEPs.

Each jackpot controller receives turnover (T/O) meter packets from the FEPs. Similar to local jackpot processing, the jackpot controller processes T/O meter received and applies all the validation process currently followed by a jackpot controllers for local jackpots such as validity of EGM, status of theme, status of EGM, boundary conditions, bad meter etc for the Wide area jackpot. The jackpot controller 111, 121, 131 will update the database with the T/O value.

The site controller 114, 124, 134, whenever it receives Jackpot pool request from Master Controller 111, calculates the local jackpot pool values and hidden pool value based on the T/O value. If the Jackpot pool value is within the local controller's limit, the updated pool value will be sent to the Master controller 111 and the local contribution value saved in the database. If the Jackpot pool value is not within controller's limit, the local jackpot contribution will be set as zero and zero contribution will be sent to the Master controller.

The Master controller 111 in the WAN system periodically sends a Jackpot pool request to all site controllers 121, 131. Whenever a Jackpot Pool request is received from the Master controller, all the Slave controllers participating in wide area theme will respond to this message with local slave controller's JP contribution. The Master controller 111 receives contributions from all the participating venues and consolidates local jackpot contributions from all the venues on a theme by theme basis. The Master controller will then send updated Jackpot Pool value to all slave controllers 121, 131 and also to the local display 115. If the master controller did not receive local contribution from any of the controllers participating in WAN theme, it will wait for a configured period of time before consolidating the other values.

Random Jackpot Wins

Once the Master controller 111 consolidates local contribution received from all site controllers, it will compare the current wide area Jackpot pool (JP) value with the configured Trigger value for each of the wide area Jackpots. If any of the current JP values are greater than the trigger value for the respective jackpot, the master controller initiates Random Jackpot win process. The Master Controller 111 selects a slave controller 121, 131 that has contributed maximum JP value in a configured interval and make a Hit offer to it. If the slave controller is ready to accept the hit offer, it sends an acceptance message or else will send reject hit offer message. Once the Hit offer Acceptance Message is received, the Master controller sends a hit notification message to all slave controllers which will route this message for local display. All slave controllers will send any unsent local contributions as a response to the notification message.

The Master controller 111 receives any outstanding local jackpot contribution from all the site controllers 124, 134 and then determines the win amount. The Master controller 111 then sends the final win amount and each site's contribution towards the jackpot win amount to all the slave site controllers 124, 134. The Master controller 111 then resets the jackpot pool as per the defined reset procedure. All site controllers 114, 124, 134 receive the win message and send it to the local display server 115, 125, 135. In the winning site, IJPC 117, 127, 137, randomly selects one of the active EGM configured to participate for that particular theme/Jackpot. The IJPC 117, 127, 137 will send the Winning EGM details to the Site controller which will route to the Master. Reset will be done by the key-off at the EGM. This reset message is received by the IJPC and sent to the site controller. Manual payment is made.

EGM Generated Win

In an EGM generated Wide Area Jackpot Hit, the Jackpot hit information is sent to the IJPC application 117, 127, 137 which validates the hit and sends the hit information to the site controller. The site controller in turn sends it to the Master Controller 111. The Master controller 111, determines the jackpot win amount and sends the win amount and individual site's contribution for that Jackpot to the all the participating site controller 114, 124, 134. The site controller sends this win information to the local signage 115, 125, 135. Once the win amount is received by the site controller from the Master it then routes it to the IJPC to initiate manual payment process. All the Jackpot messages are time stamped so that closer winners can be judged and the prize amount can be determined according the configuration.

Depending on the implementation there might be a separate overhead signage display for the WAN jackpots or the existing display servers which display the local jackpot values can also be used for displaying the WAN jackpot values. The jackpot win message and updated pool values will be broadcast to all site controllers periodically at a configured interval. The Jackpot message displayed in the winning site may be different from non-winning sites.

If any of the Site controllers 114, 124, 134 lose communication with Master controller, it is treated as an offline controller. When a site controller goes offline, according to the configuration it can either continue play or make all EGM configured for WAN theme unavailable for play by locking them. If it continues to play, when the data connection with the master is restored, it will send the current JP value to the Master if it is less the local site contribution limit.

The Jackpot Hit notification message, Jackpot win message, Jackpot configuration change history details, Jackpot Reset message are sent to an Audit trail component of a system such as Aristocrat's system 7000. Similarly, updated JP value is sent to the Audit Trail.

All Jackpot related messages such as Jackpot Hit, Jackpot Win, updated jackpot pool values, start or stop of themes are sent to the display server for display in the local signage 115, 125, 135 by the site controller 114, 124, 134. The Win information is different for winning venue and non-winning venue. The win information is displayed till the win amount is calculated by the Master controller and sent to all the site controllers. The local contribution to the wide area jackpot will be reflected immediately in the local display device. IJPC will be sending the details to the local display signage. For In-EGM display, the IJPC will send the updated jackpot information received from site controller to the Floor server which will route it to a Floor network for In-EGM display.

System Architecture

Figure 2:
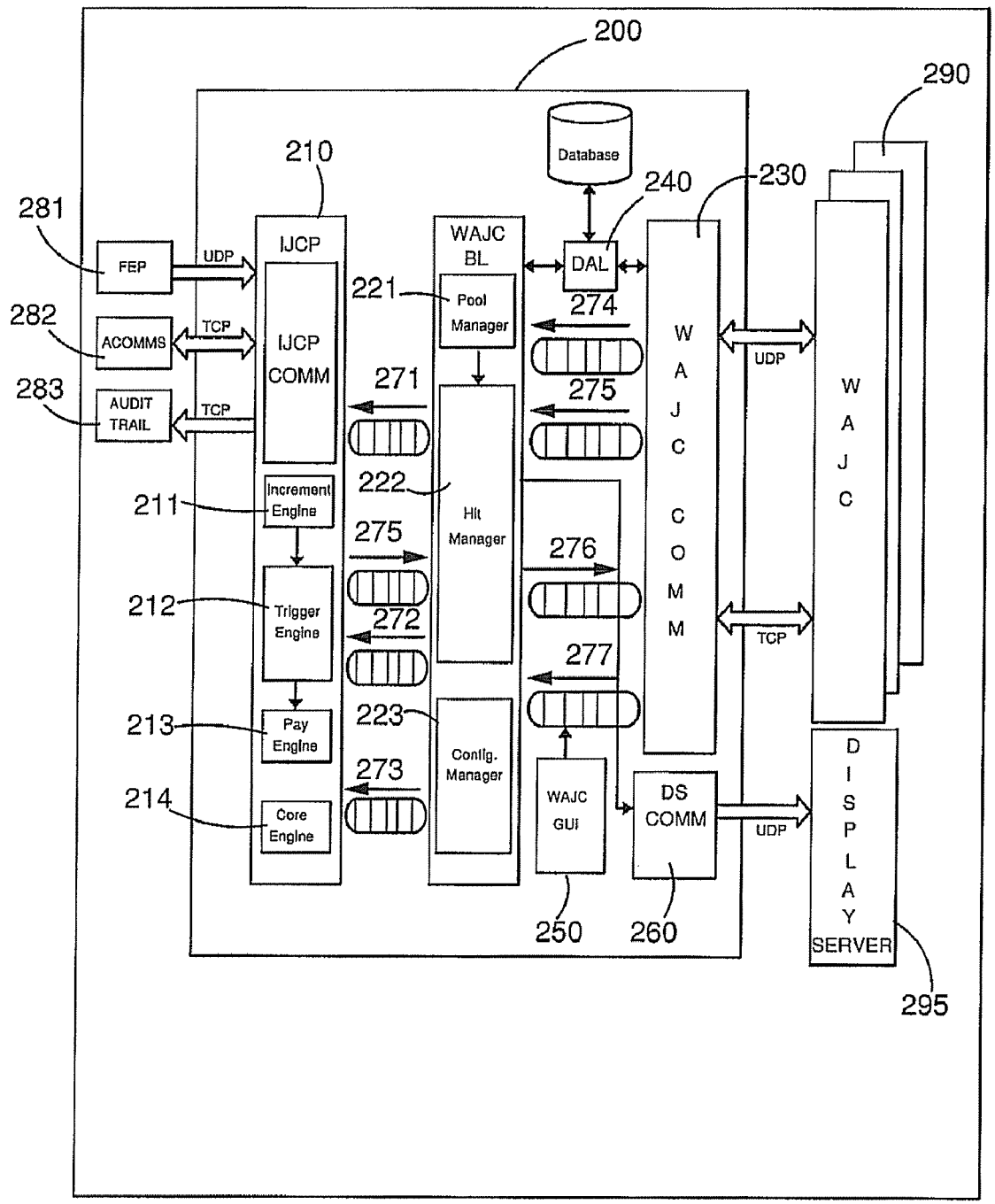
FIG. 2 shows the technical architecture of a wide area jackpot system.

The system architecture is shown in FIG. 2. In FIG. 2, components to the left of line A-A are embodied in the IJPC 117, 127, 137 and components to the right of line A-A are embodied in the site controller 114, 124, 134. In FIG. 2, the components for both a master and a slave controller are present. The WAJC network 290 is used to represent communication to and from the master controller where the Jackpot controller 200 acts as a slave.

Each Wide Area Jackpot Controller has three core components namely the WAJC COMM Module 230, Business Layer Module, and a Web based graphical user interface GUI 250. The external interfaces to the WAJC application are the Wide Area Jackpot Network 290, a System 7000 Audit Trail 283, a Display Server 295.

The business layer module 220 has three modules each designed to perform its own task in an asynchronous manner. These are the Configuration Manager 223, Pool Manager 221 and Hit Manager 221. Microsoft Message Queuing (MSMQ) is used as a communication interface between the WAJC COMM module 230 and Business layer 220. Four separate private message queues (MQ) are created for the message flow between these modules. These are the Configuration Manager Message Queue (CM MQ) 277, Pool Manager Message Queue (PM MQ) 274, Hit Manager Message Queue (HM MQ) 2275, and WAJC COMM Message Queue (WAJC COMM MQ) 276. The outbound messages from Configuration Manager and Hit Manager are sent to the WAJC COMM MQ 276. Inbound messages of Configuration Manager, Pool Manager and Hit Manager are put in their respective queues—i.e. CM MQ 277, PM MQ 274 and HM MQ 275 respectively by the WAJC COMM module.

The Configuration Manager 223 of the Master Controller is responsible for sending synchronisation and the WAN jackpot configuration information to the slave controllers. The WAJC COMM module 230 in the slave controllers will receive these messages and put it in the CM MQ 227. The Configuration Manager 223 of the Slaves will asynchronously receive these messages from CM MQ 227 and initiate the process to set local system's time with the received value and synchronising WAN Jackpot configuration to the local database 245. The slave controllers will then send a response message to the WAJC COMM 276 queue which in turn will route it to the Master Controller 290.

The WAJC COMM module 230 is the communication interface to the business layer and to other controllers. TCP is used as the communication protocol for data transfer between the WAJC application and the Wide Area Jackpot network 290 and the S7000 Audit Trail 283. UDP is used as the communication protocol between the WAJC and the display server and to exchange controller information through multicast address.

The WAJC COMM module 230 will receive the Master Update from the Master Controller 290 and put it in the PM MQ 274. Pool Manager 221 of the slave controller will receive this message from its message queue and update the received value in the local database. If the controller is a Master, the Pool Manager 221 will receive the local contribution from all the configured controllers from the PM MQ, consolidate the local contribution from all the venues for each of the jackpot and persist the Jackpot values in the database. After updating the values in the database it will signal the Hit Manager 222 carry out do the Jackpot Hit checking process.

The WAJC COMM 230 of the designated Master controller periodically requests a local Jackpot contribution from each participating site controller by means of jackpot poll request. The Hit Manager of the site controllers 222 will asynchronously receive this from HM MQ 275, perform jackpot calculation process, and send the calculated local jackpot value contribution to the Master 290. The Hit Manager 221 of the master on receiving the signal from the Pool Manager 221 will compare the current active WAN jackpot values with their corresponding trigger values. If any of the WAN Jackpots satisfies the jackpot rules, it initiates the WAN Jackpot hit process. It selects a site controller randomly based on the defined fairness criteria of the jackpot rules and sends a Hit Offer to that site. If a Hit Offer Response is not received from that site within the configured timeout period, then it selects another eligible site controller and sends the Hit Offer to that site. If the Hit Offer Response is received from the site within the timeout period, this will send the hit indication message to the WAJC COMM queue 276, from where it will be forwarded to all the connected slaves by the WAJC COMM 230. Then it calculates the final win amount and sends the win details to all the slaves by putting the message in the WAJC COMM queue 276.

The Hit Manager 222 in the Slave site controllers receive any EGM generated hits via the FEP 281 on any WAN jackpots from the local IJPC 210 and put it in the WAJC COMM 230 queue to route it to the Master Controller 290. The Hit Manager 222 asynchronously receives the Jackpot Pool Request message from its message queue 274 and forms the local contribution message and put it in the WAJC COMM queue 276 to route it to the Master 290. The Hit Manager is responsible for sending the updated WAN jackpot pool values to the Display Server and the local S7000 system. If the current site controller is selected as the jackpot winner for a random jackpot hit, the hit offer message will be received by the WAJC COMM 230 and it will put it in the HM MQ 275. Then the Hit Manager will receive it from the queue and send a message to the local IJPC 210 to select a winner EGM in the local site. Once the IJPC selects a winning EGM, it will put the message containing the winning EGM details in HM MQ

275. Then the Hit Manager 222 will receive that message and send the winner details to the Display Server 295.

The WAJC GUI application 250 is used to define, configure and manage the WAN jackpot system. Whenever a manual intervention is required to manage the system such as correcting the local contribution values, clearing the jackpot display, etc., the GUI will be used to perform the necessary activity.

Component Functions

WAJC COMM Module

This WAJC-COMM 230 module is the communication interface between business layer of the WAJC and COMM. modules of other controllers. This runs as a separate process and receives/sends messages from/to Master/Slave controllers.

As described above there can be only one Master in the Wide Area Network at any point of time and all the remaining controllers will be slave controllers. WAJC-COMM 230 will determine the role of controller based on the ranking table information available in the database 245. The highest ranked controller in the network will be designated as Master Controller. In the event that the highest ranked controller goes down, the next highest ranked controller will become the Master. Whenever the Primary Master (i.e. highest ranked controller) comes back again, the current or "acting" master will relegate itself to the role of site controller and handover the control to the Primary Master.

The WAJC-COMM 230 of each controller has two channels of communication; a data channel and a controller status channel. The TCP socket connection is used for data channel communication between master and slave controllers by unicast. The UDP socket connection is used to communicate controller information through multicast group.

During initial WAJC system start up all, controllers in the WAN send a controller Init message to the multicast address at a configured interval. Each controller continues sending this message until it gets a response from the Master Controller. The controller's Init message will have a controller's IP Address and Rank. In the initial start up, the rank will be empty since the controller has not received the configuration details yet. Since, the configuration details will be available only with the Master controller, the WAJC system will get initiated only when Master controller enters the Wide Area Network. The Master by virtue of ranking information available from the database will know that it is Master and send out a unicast Authority message to each controller from which it received a Controller online message. This Authority message will have the Master's IP address, its rank, requesting controller rank and Port number. The Master now creates a TCP Server (listener) and starts listening for new connections and the receiving site controllers will create TCP client socket and initiate the data communication. The Master will start accepting connections from each of the slave controllers.

Once the Master-Slave connection is established, time and database synchronization is initiated between Master and Slave and the status of synchronization maintained by the Master. In order to avoid network segmentation and scenario of having multiple Master in the WAN, Master controller will wait until minimum of 51% of the ranked controllers or configured number of nodes whichever is higher are online before starting jackpot transaction process.

A Status message is sent by Master controller to Multicast group through the UDP Socket at a configured interval and also whenever there is a change in the controller's status (online/offline). Thus each controller will know the status of all connected site controllers in the WAN system. The Master receives local jackpot contribution values from the slaves as a response to the Jackpot poll request. If the master fails to receive this response for configured number of times or if the master encounters a broken TCP connection, the status of that particular slave controller will be changed to be offline. The next status message will reflect the changed status. If the Master controller goes down there will not be any status packet from the Master sent to the Multicast group. The controller Init message is the used to update the current status of the controller.

If a controller higher ranked than the current master joins the network, it will send "Controller Init" message to the multicast address. The current master receives this message and sends an authority packet with its rank information. The higher ranked master will create a client Socket and establish a connection with the current master. Since a higher ranked controller has joined the WAN network, the current master will send a "Stop Theme" message to all the controllers. Then, it will initiate time and database synchronization with the new master. On successful completion of this, the higher ranked controller sends a Relinquish request to the current master controller. The current master sends "Relinquish Notice" to all the controllers.

Each slave controller on receiving the relinquish notice closes its socket connection with the current master and starts sending controller Online message. The current master then sends "Relinquish Accept" message to the new controller and closes connection with the new controller. The new master controller creates a server socket and goes in to a listen state. All other controller will send controller init messages and once they receive authority messages, they will establish connection with the new Master.

When the Master controller goes down (fails), the TCP connectivity with all slave controllers will be terminated. All the site controllers will start sending the controller online message again to the multicast address and this will be used to update the controller status Information. After waiting for a configured interval, the highest ranked active controller will send an authority packet. Each controller that receives this authority packet will compare its own rank with that of authority packet rank. If the rank of the controller that issued authority is higher then it will join WAN system as a slave controller.

Master Controller COMM

Master COMM is the interface between the business layer 220 and the all other local site controllers. The following are the functionalities of the COMM module of Master Controller that communicates through TCP socket.

To periodically send Time sync message at the configured intervals,

To send DB sync message, Configuration messages to all local site controllers during connection establishment and whenever there is change in the configuration detail, To periodically send Jackpot pool request at configured interval to all the participating controllers, To send Master update value to all local site controllers, To send Hit offer Message, Hit Notification message and Jackpot win message to the local site controllers To receive Local Contribution from all local site controllers, To receive EGM win message from the local site controllers, and To receive and route configuration response message, time sync and db sync response message from local site controllers to business layer.

Functional Description of Master COMM

In the Master Controller, a Listener Socket (TCP Socket) is created and it will wait indefinitely to accept the connections from the local site controllers. A separate thread is created for each of the configured/authentic site controllers that establish a connection with the master controller.

In another thread, a Control Socket (UDP Socket) is created through which the Master controller sends status packet message to the predefined multicast group. All the Controllers during start up send the Controller Online message. On receiving this message, the active highest ranked (Master) controller will send a response to those controllers. Then the controller will establish the connection with the master controller.

On successful connection, WAJC COMM 230 will send a time sync message and configuration sync messages to every slave controller. It will receive the time sync response message and update the synchronization status of the site controller. The Master controller sends a Jackpot pool request message to all local site controllers at every configured interval and receives local contribution of each jackpot from the associated site controllers, send it to the Pool Manager Message queue. It will get the Jackpot master update from the WAJ-COMM Queue and sends to all local site controllers.

It will also receive Hit Offer message, Hit Notification message and Jackpot Win Message from WAJC COMM MQ and send them to all site controllers. For EGM generated jackpot wins, it receives the EGM win message from site controller and sends it to HitManager Queue. When the TCP connection with the local site controller is broken, it will update the status of the site controller as offline. When the site controller establishes the connection again, the status will be updated as online in the database.

When the current master goes offline then the next higher ranked master will send an Authority message to the multicast group. When a controller with the higher rank than that of current master comes online then it will send the Relinquish Request message and receive Relinquish Accept message from the current master controller. The current master controller will send Relinquish Notice message to all the site controllers.

Site Controller COMM

Site Controller Comm is the interface between the business layer and master controller (i.e. WAJC COMM acting as a slave). It receives the configuration message, poll request message, master update message and Random win message and sends local contribution, EGM hit message to master controllers through TCP channel. It is arranged to:

send Local Contribution to master controller, send EGM win message to master controller, receive Time sync message, db sync message, Configuration message from master controller, receive Site controller win message from the master controller, and receive Hit Offer, Hit Notification, Jackpot win message and master updates from the master controller.

A Site Socket (TCP Socket) is created and it identifies who is the master controller and establishes the connection with it. A thread will be created to receive messages from master controller. It receives configuration messages, Hit Notification messages, Random win message from master controller and routes it to the appropriate WAJC message queues. It receives local contribution message, EGM win message from business layer and routes it to the master controller.

A Control Socket (UDP Socket) is created; it is used to send Status packet, Controller Init message to multicast group.

Configuration Manager

The following functionalities are performed by the Configuration Manager.

Sends the time synchronisation message from the Master to all the slaves when initiated from the UI and in configured periodical time intervals, Receives the time synchronisation message in the slave site controllers and set the local system's time to the received timestamp value, Sends the WAN themes and jackpots configuration message from the Master to all the slaves after the connection is established, Receives the WAN theme configuration message from the Master in the local site controllers after the connection is established, Sends the WAN theme start and stop messages from the Master to all the slave site controllers, Stops a theme if the number of participating controllers becomes less than the defined minimum limit, Receives the WAN theme start and stop messages from the Master and forwards it to the local IJPC to start or stop those themes in the local site, and Archiving and purging the log files and database in the configured time intervals.

This Configuration Manager is responsible for setting up the system to be able to run by doing the initial start up process. It reads the configuration settings from the init file and set the respective global variables in the application.

If a jackpot controller is a Slave, the Configuration Manager waits for the "Connected to Master" message from the COMM and once it is received, this will start the Pool and Hit Managers of the local system. If the current controller is the Master and whenever a slave is connected, the Configuration Manager will receive a "Slave Connected" message from the COMM and send the time synchronisation message to that slave. The Configuration Manager of the slave controller will receive this time sync message and set its local system's time to the received timestamp value. Then it will get its local system time and send a time synchronisation response message containing this timestamp. The Configuration Manager of the Master receives this time synchronisation response message and checks the difference between the received timestamp value and its local system's time. If the difference is not less than, for example, 3 seconds, then it will send the time synchronisation message again to the same controller, provided the time sync retry count is greater than 0. If a site controller is not successfully time synchronised with the Master, it is not be allowed to start or stop any WAN theme in its local site and this time sync failure will be indicated in the slave site's display server.

After successful time synchronisation, the Configuration Manager of the Master will send the WAN themes configuration information to the slaves. The slaves receive this configuration information and update their local databases. WAN theme configuration can be defined only in the Master Controller. If a WAN theme is started at the Master, the Configuration Manager 223 will check whether the number of connected site controllers is greater than or equal to the 51% of the defined controllers or minimum number of nodes to be online, whichever is higher. If this condition is satisfied, then configuration manager 223 starts the theme in the Master's local site and send this theme start message to all the connected slaves. The Configuration Manager 223 at a slave controller receives the message and puts it in IJPC Core Engine's message queue 273 to start the received WAN theme in its local site. If it has been configured that the associated EGMs should be locked if the theme is stopped, then this will send the "Lock EGM" message to the respective EGMs. If a WAN theme is stopped at the Master, then this will stop that theme in the Master's local site and send a WAN theme stop message to all the connected slave controllers to stop the theme in their local site also. The slave controllers will receive this theme stop message and put it in the local IJPC Core Engine's message queue 273 to stop the theme locally.

Whenever the configuration information is changed in the Master, it will be updated to all the site controllers. The configuration manager 223 of the site controllers will receive the information and update it in the database and log it in local S7000. The IJPC will do its job without any interference from the site controller system. If the local system is the current Master Controller and if another higher ranked Master Controller comes online, then current Master's data will be synchronised with the new Master using this Configuration Manager 223 so that it will have the updated configuration and jackpot information to proceed. In the configured time intervals, the Configuration Manager 223 purges the older data in the log files and database. Whenever a controller goes offline, the Configuration Manager 223 will check the minimum site limit for those themes in which the controller was participating. If the minimum site limit condition is not satisfied for a theme, then this will stop that theme automatically in the wide area jackpot network, that is, in all the participating sites.

Pool Manager

The following are the main functionalities of the Pool Manager module.

To process the Master update from Master Controller and the local contribution message from Slave Controllers, Calculate the jackpot pool contribution and hidden pool contribution based on the defined increment percent Update the current WAN jackpot pool values for every jackpot under every WAN themes, Persist the WAN jackpot pool values in database, Send signal to the Hit Manager to do the WAN jackpot hit checking process, and Send poll message to IJPC to check its status.

The Pool Manager asynchronously receives the messages one by one, if any, from the Pool Manager Message Queue (PM MQ) 274. These messages are the Master Update message received from the Master Controller and the local contribution message from the individual site controllers. This will parse the received message and extract the values of individual elements in a list. Based on the identified Message ID, this will call the corresponding function to do further processing. If the received message is a Master Update, then this will update the received value in the database. If the received message is the local contribution message, then this will calculate the delta value from the last received local contribution and add the delta value into the corresponding jackpot pools and update the value in the database. Any exceptional scenarios will be logged into the event viewer.

After processing all the local contribution messages, the Pool Manager 221 will signal the Hit Manager 222 to do the random hit checking process. This can happen only in the Master Controller. This will send a poll message to the IJPC Core Engine's message 273 queue at configured periodical intervals and receive the response to check its status. If it doesn't receive the response within the configured time interval for the configured retry count number of times, then it will assume that the IJPC is in a stopped state and update this status in the database accordingly.

Hit Manager

The Hit Manager 222 is responsible for identifying and managing the hits that occur on any of the WAN jackpots. The Hit manager 222 identifies the type of the hit and process the hit accordingly. It sends the updated WAN jackpot pool values to the display server and to the S7000 in the configured time intervals. It adds the current local contribution with the last received Master update and sends the local contribution to the display server so that any local contribution will reflect to the local site immediately. Whenever a Jackpot Pool Request is received from the Master, the Hit manager 222 will check the current local turnover and apply the increment percentage. If the local contribution value is less than the defined limit, the Hit manager 222 forms the local contribution message containing the full local contribution value and send it to the Master by putting it in the WAJC COMM message queue. The purpose of sending the full contribution value is, if the current packet is lost in the network, then the Master can get the actual contribution value from the next packet and so the data is not lost at any point of time. If the local contribution value is greater than the defined increment limit of the jackpot, then the Hit manager 222 will log the value in the S7000 Audit Trail and send the local contribution value as 0 for the current poll cycle. If the site is offline from the Master, then the site will not contribute any turnover to the WAN jackpots. The outstanding amount will be given to the Master once the connection is established again.

The Hit Indication message and the Win Details message are received by this Hit Manager 222 and they are sent to the display server 260, 295. The Hit manager 222 will receive the EGM hits that occur in the local site identified by the IJPC and send it to the Master Controller to process it further. If the local site is identified as the jackpot winner for a random jackpot win by the Master, then the Hit manager 222 will receive the hit offer and send a hit offer response back to the Master. Once the final win amount is received from the Master, the Hit manager 222 will select a winning EGM in the local site using the Pay Engine 213 functionalities of IJPC and send the jackpot win details such as theme name, jackpot name, machine name and the win amount to the display server. Until then the hit notification message will stay displayed in the display server. Only the winning machine will be locked up and play will continue in other machines.

The jackpot win message will be different for local and remote hits. While the local hit displays the win details including the machine number, the remote sites will display only the winning site name, jackpot name and win amount. Once the manual payment is over, the IJPC will receive the jackpot reset message from the EGM/MCI and forward it to the Hit Manager 222. Then this will receive the message and send a jackpot reset message to the display server to clear the displayed hit message. The duration of the displayed hit message will be different for the winning and non winning sites. The winning site will display the hit message until a reset is received from the EGM/MCI or UI. If the display server is not reset back to normal display after the defined timeout period, a jackpot reset message will be initiated from the UI to clear the hit message.

The Hit Manager sends the updated pool values to the display server in the configured time intervals. After receiving the local contribution values from the slave site controllers, the Pool Manager updates the values in the database and signal this Hit Manager and this will send the Master update to all the connected slave site controllers. The Hit manager 222 will handle the EGM hits and the random hits that occur on any of the WAN jackpots in the following manner.

Figure 3:
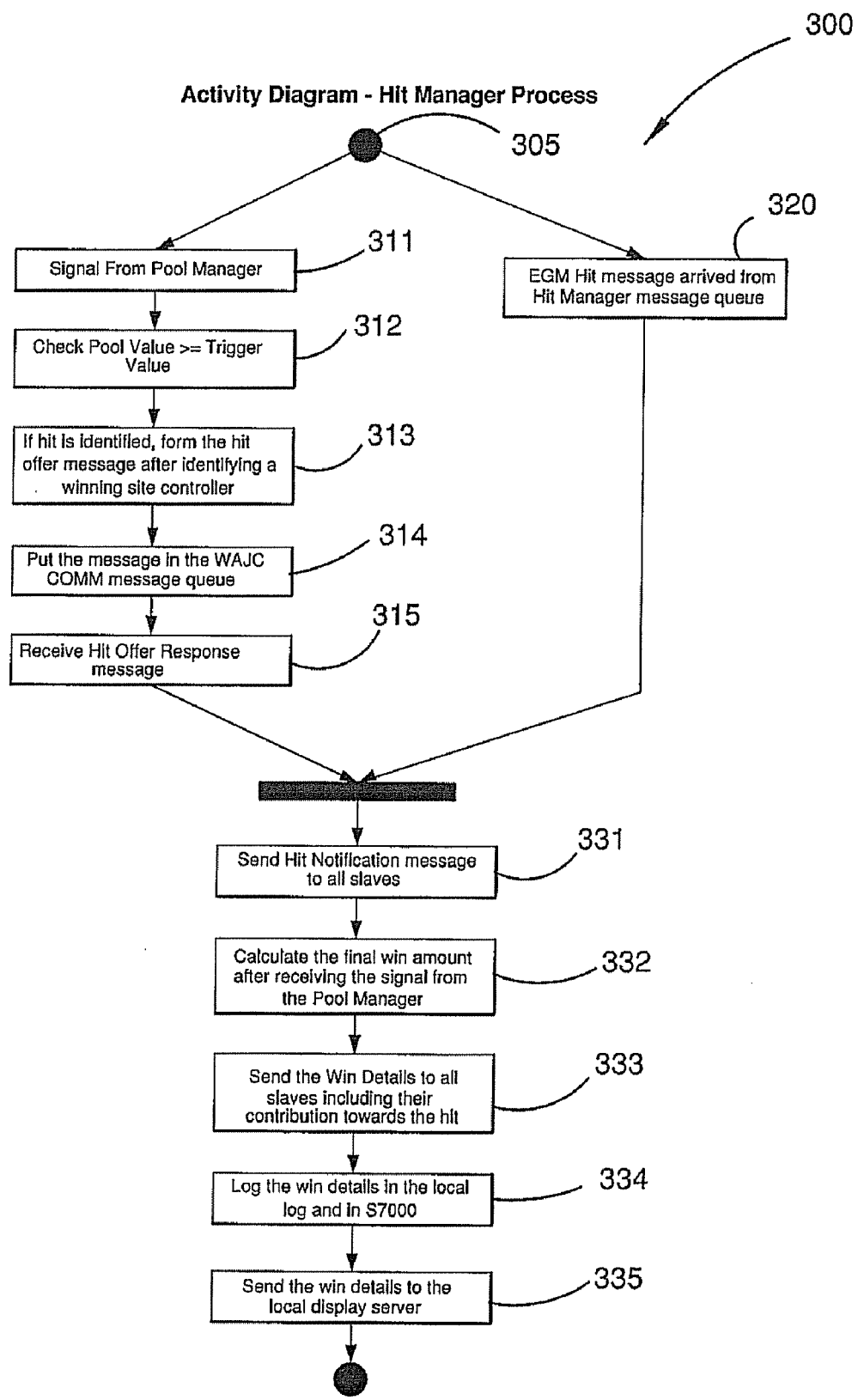
FIG. 3 shows the process flow for the Hit Manager of a Master Controller.

FIG. 3 shows the Work Flow for the Hit Managers.

Work Flow for Random Win

Master Hit Manager will wait 205 for the signal from the Pool Manager.

After receiving the signal from the Pool Manager 311, it will check for the existence of WAN themes and jackpots in the hash table.

For all the current active WAN jackpots, it will check their pool value with their corresponding trigger values.

If Pool Value>=Trigger Value 312, it will select a site controller randomly 313 which contributed more within the configured time period for the jackpot on which the hit occurred.

Then it will send 314 a Hit Offer to the site controller to check whether it is ready to accept the hit or not.

If the site is ready to accept the hit, then it will send the Hit Offer Response to the Master. Otherwise, it will reject the hit offer.

If Hit Offer Response is not received from that site within the configured timeout period, then the Master will select another eligible site controller based on the above fairness criteria and send the hit offer.

If the Hit Offer Response is received from that site controller, then it will send a Hit Indication message 331 to all the site controllers to inform the hit.

All the site controllers will receive the hit indication message and send it to the local display server and send their current local contribution to the Master.

The Master will receive the local contribution message from all the site controllers as the response for the Hit Indication message.

The Pool Manager will add the local contributions of all the site controllers to the respective jackpot pool and signal the Hit Manager to continue the hit processing.

The Hit Manager will decide the win amount 332 based on the jackpot pay option, that is, either on hit or on acceptance.

The master jackpot controller sends the final win amount 333 and each site's contribution towards the jackpot win amount to all the slave site controllers. It will then reset the jackpot pool as per the defined reset procedure.

All the non winning site controllers will receive the win message and send it to the local display server.

The winning site controller will receive the win message and send a message to the local IJPC to select an eligible EGM in the local site as the jackpot winner.

The IJPC will select an eligible EGM in the local site based on the defined business rules and send the details of that EGM to the site controller.

The site controller's Hit Manager will receive the details and send it to the display server.

The player at the winning EGM will be paid with the win amount manually.

Reset will be done by the key-off at the EGM or from the MCI. This reset message will be received by the IJPC and it will put the reset message in Hit Manager's message queue.

Otherwise, the jackpot reset can be generated from the GUI. The Hit Manager will receive this message and send it to the display server to clear the displayed hit message.

The win details will be logged in the local log and in the S7000 334 both in the site controllers and in the Master.

Workflow for EGM Win

The Hit Manager will be waiting for an EGM hit 305 in the local site on any WAN jackpot.

The IJPC will receive the EGM hit first and validate it. If it is a valid hit and if has occurred on a WAN jackpot, it will put the EGM hit message in the Hit Manager's message queue.

The Hit Manager will receive the hit message and send it to the Master by putting it in the WAJC COMM message queue.

The Master's Hit Manager will receive this hit message 320 and send a hit indication message to all the site controllers to inform them of the hit.

If more than one EGM hit on a same WAN jackpot is received in a close succession, then Master will decide what will be the win amount for the second EGM based on the defined configuration.

All the connected site controllers will send their current local contribution to the Master.

The Pool Manager will add the local contributions of all the site controllers to the respective jackpot pool and signal the Hit Manager to continue the hit processing.

The Hit Manager will decide the win amount 332 based on the jackpot pay option, that is, either on hit or on acceptance.

It will send the final win amount 333 and each site's contribution towards the jackpot win amount to all the slave site controllers.

It will then reset the jackpot pool as per the defined reset procedure.

The non winning site controllers will receive this message and send it to the display server.

The winning site will send this message to its local display server and the player at the winning EGM will be paid the win amount manually.

Reset will be done by the key-off—e.g. at the EGM. This reset message will be received by the IJPC and it will put the reset message in Hit Manager's message queue.

Otherwise, the jackpot reset can be generated from the GUI.

Hit Manager will receive this message and send it to the display server to clear the displayed hit message 335.

The win details will be logged in the local log and in the S7000 both in the site controllers and in the Master 34.

Interface Description

It shall maintain the status of EGM that are configured to participate in WAN theme, It shall send configuration messages to EGM for a WAN theme when the theme is started, It shall receive the acknowledgement from EGM on WAN theme configuration, It shall identify the winning EGM for random jackpot hits similar to local theme, It shall send the EGM generated wide area Jackpot hit to the site controller, and It shall receive the jackpot win amount form site controllers to confirm a hit with a random EGM on random jackpot hits.

For the WAN jackpots the Increment Percentage should be considered as 100% and the calculation will be as follows:

Increment Value=Delta Meter*Scaling Factor

The IJPC 210 sends the WAN jackpot data at least once every 3 seconds (configurable) to the site controller or the Site Controller itself shall retrieve the data from the IJPC database.

The local site controller shall determine the turnover contributions to the wide area jackpots Any local turnover will be reflected on the local displays immediately IJPC will send the local EGM hit on any of the WAN jackpots to the site controller so that it can be sent to the local display and to the Master immediately.

When a Wide Area Theme is in play, the Master will poll each Slave (system, poll) every 15 seconds (configurable) for any increase (or decrease) in contributions (local increments) to the wide area jackpots.

Then the Master shall send the updated wide area jackpot values to teach site controller, which then updates their jackpot displays.

Figure 4:
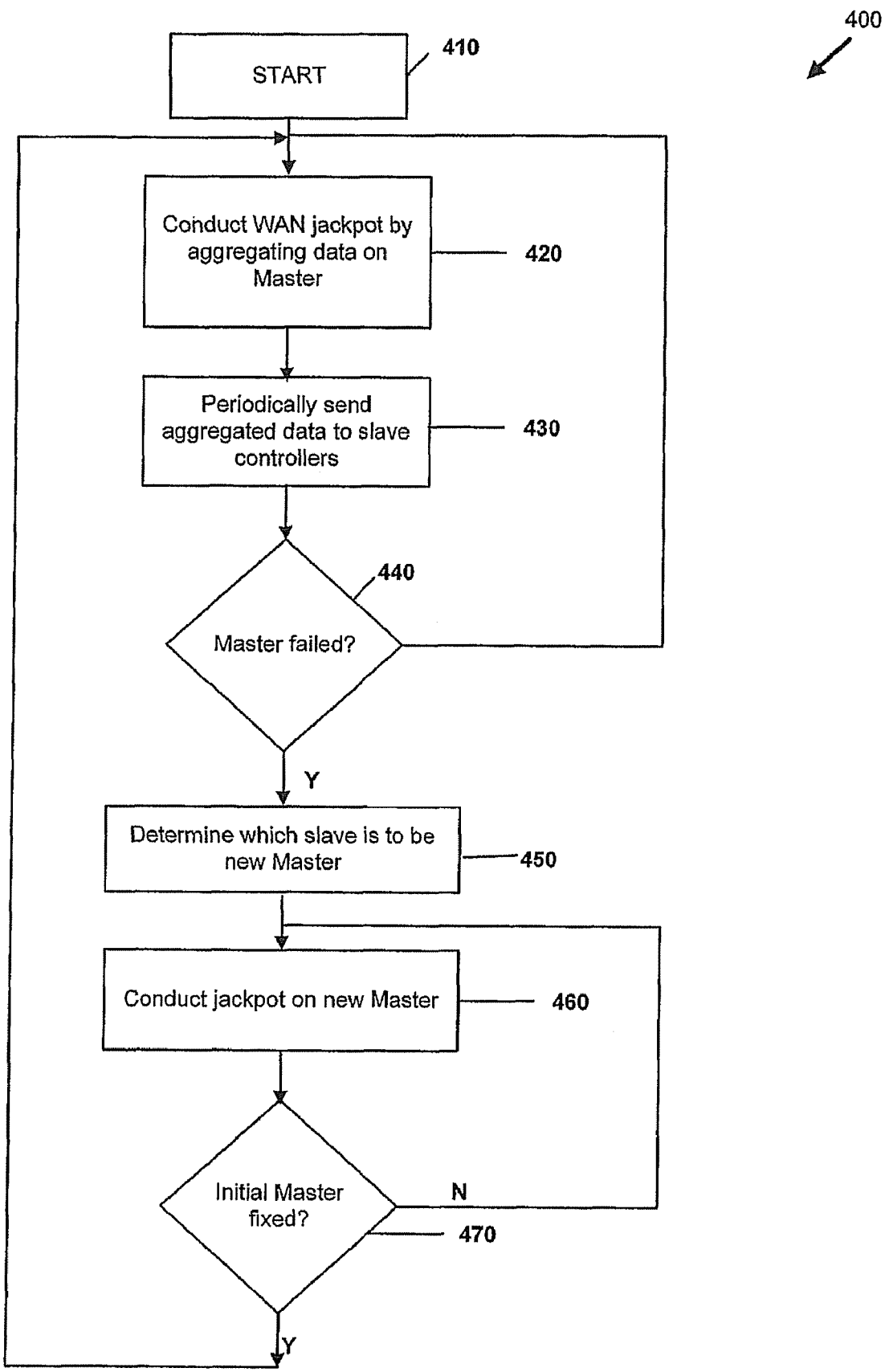
FIG. 4 if a flow chart of a method of an embodiment.

The method of the embodiment is summarized in FIG. 4 which shows that after start up 410, a Wide Area Network Jackpot is conducted on a Master Controller by aggregating data 420. The aggregated data is periodically sent to the Slave Controllers 430. If the Master fails, the method involves determining which Slave is to be the new Master 450 and conducting the jackpot on the new Master 460. If the initial Master is fixed 470, the jackpot is transferred back to the Master.

Figure 5:
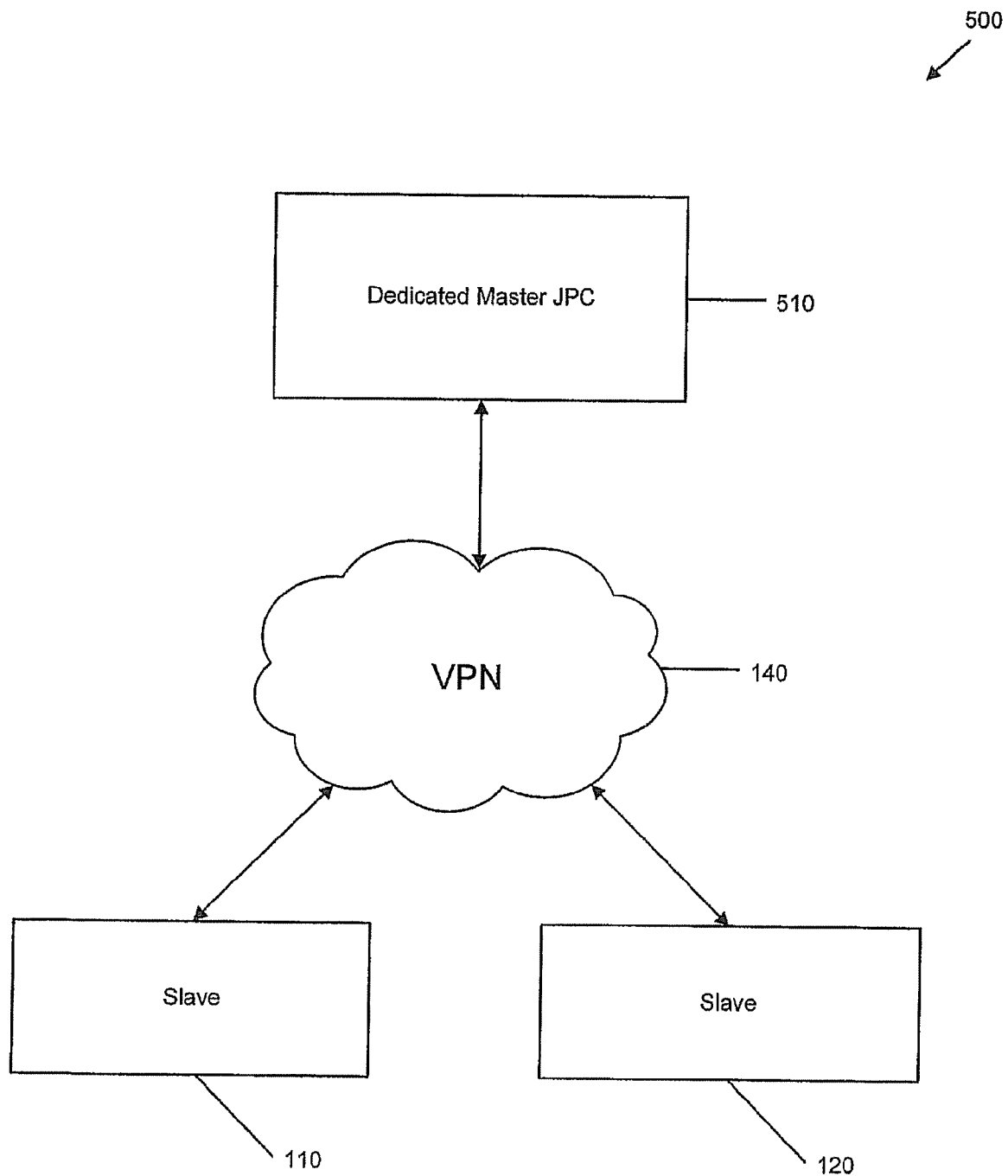
FIG. 5 shows a jackpot system of an alternative embodiment.

In the above description, in particular in relation to FIG. 1, it has been described that all jackpot controllers are capable of acting as both Master and Slave. In larger networks it may be attractive to have a dedicated Master jackpot controller. Such an arrangement is shown in the gaming system 500 of FIG. 5 where a dedicated Master Controller 510 is connected via the Virtual Private Network 140 to a pair of Slave Controllers 110, 120. These Slave Controllers are able to take over as the Master jackpot controller. Further, it will be appreciated that while the modular approach described above and the technical architecture particularly as described in relation to FIG. 2 is arranged such that the controller can act as a Master or Slave, some venues may be configured to only act as Slave Controllers. It will also be appreciated that some venues may have more than one Jackpot Controller depending on the number of deployed gaming machines. Other variations will be apparent to a person skilled in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

The invention claimed is:

1. A jackpot system comprising
at least two jackpot controllers including a first jackpot controller arranged to act at least as a master jackpot controller and a second jackpot controller arranged to act as either a master or a slave jackpot controller,
the first jackpot controller arranged to act as the master jackpot controller by conducting at least one jackpot during which the master jackpot controller aggregates jackpot data and at least periodically communicates the aggregated data to at least the second jackpot controller, and
the second jackpot controller arranged to act initially as the slave jackpot controller and communicate jackpot data to the first jackpot controller for aggregation, the second jackpot controller arranged to store the aggregated data received from the first jackpot controller and to act as the master controller if the master jackpot controller fails by continuing to conduct the at least one jackpot based on the stored aggregated data and by aggregating further jackpot data; and
wherein the jackpot system comprises at least one other jackpot controller arranged to act at least as a slave jackpot controller; and
wherein each other jackpot controller is capable of acting either as a master or a slave jackpot controller and is arranged to receive and store aggregated data and to conduct the at least one jackpot based on the stored aggregated data in a reconfigured jackpot system if necessary; and
wherein each of the jackpot controllers stores a ranking table which specifies the order in which jackpot controllers become the master jackpot controller if there are one or more failures and the jackpot system is reconfigured based on the ranking table.

2. A jackpot system as claimed in claim 1, comprising at least a third jackpot controller arranged to act as either a master or slave jackpot controller and to receive and store aggregated data from at least one of the first and second jackpot controllers and to continue to conduct the at least one jackpot based on the stored aggregated data in a reconfigured jackpot system in which the third jackpot controller acts as the master controller if the first and second jackpot controllers fail.

3. A jackpot system as claimed in claim 1, wherein if the current master jackpot controller fails, each jackpot controller checks the ranking table to determine whether to start to act as a master controller.

4. A jackpot system as claimed in claim 3, wherein the jackpot controller that determines it is now the master jackpot controller establishes the at least one jackpot on itself.

5. A jackpot system as claimed in claim 3, wherein each jackpot controller that determines that it is still a slave controller establishes communication with the master jackpot controller.

6. A jackpot system as claimed in claim 5, wherein each jackpot controller that determines that it is still a slave controller communicates any jackpot data not in current aggregated data to the current master jackpot controller.

7. A jackpot system as claimed in claim 1, wherein the master jackpot controller is arranged to aggregate data for a plurality of separate jackpots and each other jackpot controller is arranged to communicate jackpot data for at least one of the jackpots.

8. A method of conducting a jackpot comprising:
conducting at least one jackpot by aggregating jackpot data received from a plurality of jackpot controllers at a first jackpot controller acting as a master jackpot controller;
at least periodically, communicating the aggregated data to at least a second jackpot controller acting as a slave jackpot controller and also arranged to act as the master jackpot controller;
storing the aggregated data from the first jackpot controller at the second jackpot controller; and
upon the master jackpot controller failing, continuing to conduct each at least one jackpot based on the stored aggregated data with the second jackpot controller acting as the master controller;
at least periodically communicating the aggregated data to a third jackpot controller is arranged to act as either a master or slave jackpot controller;
continuing to conduct the at least one jackpot based on the communicated aggregated data with the third jackpot controller acting as the master controller upon both the first and second jackpot controllers failing;
at least periodically communicating the aggregated data to each jackpot controller in the jackpot system, and continuing to conduct the at least one jackpot based on the communicated aggregated data in a reconfigured jackpot system with one of the jackpot controllers if necessary; and
storing by each of the jackpot controllers a ranking table which specifies the order in which jackpot controllers become the master jackpot controller if there are one or more failures and the jackpot system is reconfigured based on the ranking table.

9. A method as claimed in claim 8, wherein if the current master jackpot controller fails, the method further comprising checking by each jackpot controller the ranking table to determine whether to start to act as a master controller.

10. A method as claimed in claim 9, comprising establishing the at least one jackpot on the jackpot controller that determines it is now the master jackpot controller.

11. A jackpot system as claimed in claim 9, further comprising establishing by each jackpot controller that determines that it is still a slave controller communication with the master jackpot controller.

12. A jackpot system as claimed in claim 11, further comprising communicating by each jackpot controller that determines that it is still a slave controller any jackpot data not in current aggregated data to the current master jackpot controller.

13. A jackpot system as claimed in claim 8, comprising aggregating data for a plurality of separate jackpots on the master jackpot controller and each other jackpot controller communicating jackpot data for at least one of the jackpots to the master jackpot controller.

* * * * *